Feb. 6, 1934.  J. D. SIDDELEY  1,946,335
LUGGAGE CARRIER FOR MOTOR VEHICLES
Filed July 2, 1932   2 Sheets-Sheet 1

Inventor
John D. Siddeley
by Mawhinney & Mawhinney
Attorneys.

Feb. 6, 1934. J. D. SIDDELEY 1,946,335
LUGGAGE CARRIER FOR MOTOR VEHICLES
Filed July 2, 1932 2 Sheets-Sheet 2

Inventor
John D. Siddeley
by Mawhinney & Mawhinney
Attorneys.

Patented Feb. 6, 1934

1,946,335

UNITED STATES PATENT OFFICE 1,946,335

LUGGAGE CARRIER FOR MOTOR VEHICLES

John Davenport Siddeley, Kenilworth, England

Application July 2, 1932, Serial No. 620,697, and in Great Britain August 1, 1931

3 Claims. (Cl. 296—37)

This invention relates to means for carrying luggage on motor-vehicles, and it has for its primary object to provide a construction of luggage-carrier which is concealed when not required but which provides considerable carrying space.

According to this invention, there is a recess in the vehicle, preferably in the back of the body, and a cover for the mouth of the recess is mounted to be movable into an open position, where it forms a tray for supporting the luggage. There is also a guard, preferably in the form of a metal grid, which is mounted inside the recess but arranged to be movable to protect the edge of the vehicle around the recess from damage by any luggage mounted on the tray.

Preferably both the cover or tray and the guard are pivotally mounted, and they may be arranged and interconnected, as by hinged links, so that, as the former is moved to the closing position, the latter will be simultaneously withdrawn into the recess, the links acting also for supporting the tray in the open position.

Figure 1:
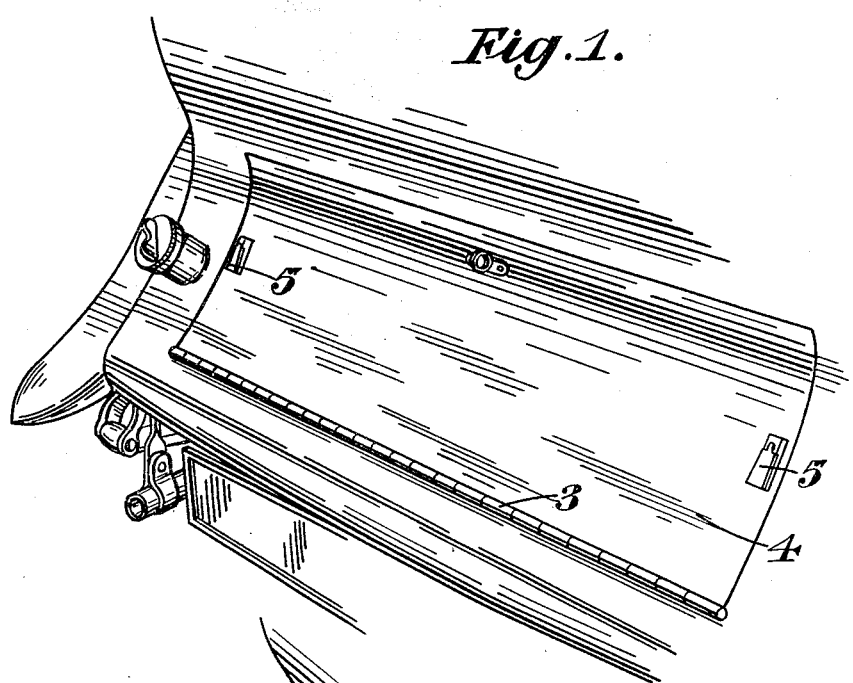
Figure 2:
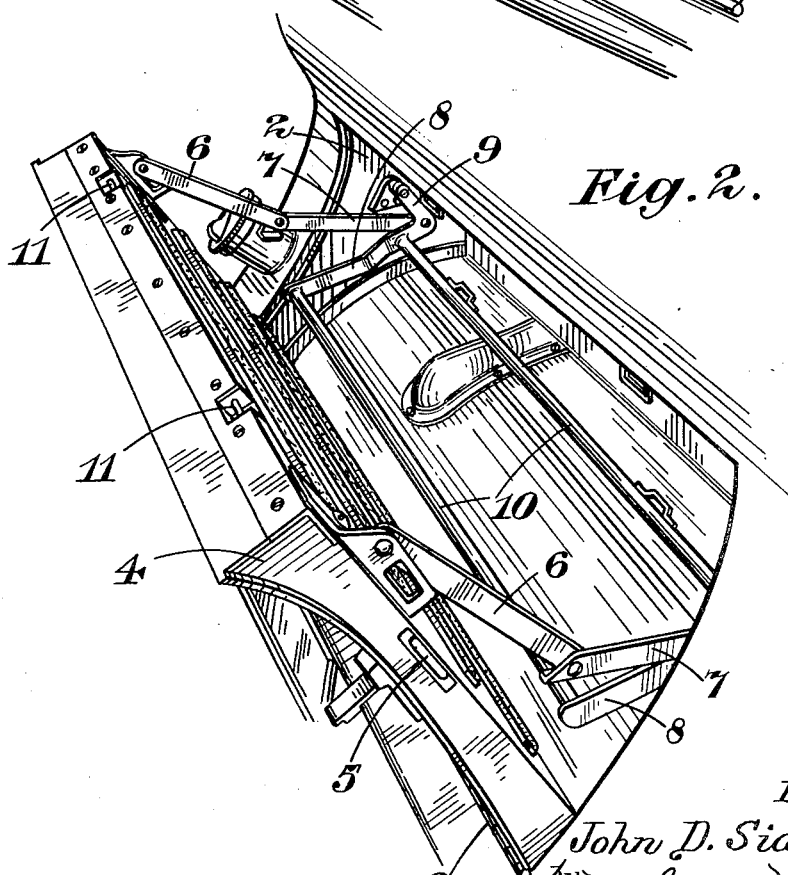
Figure 3:
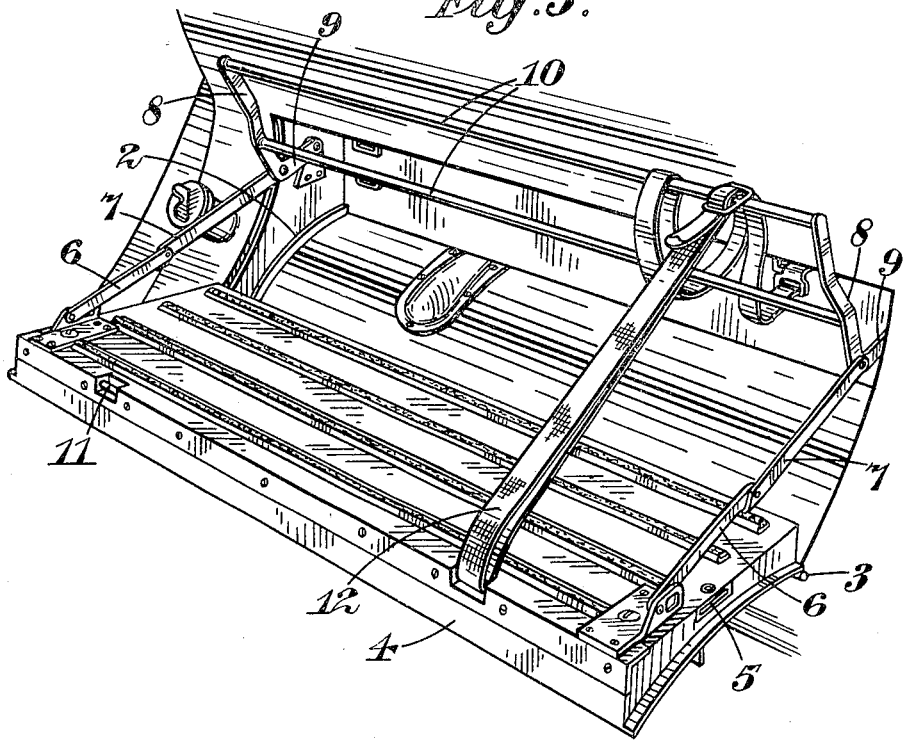

In the accompanying drawings,

Figure 1 is a perspective fragmentary view of part of the back of a motor-car embodying the invention, the cover being shown closed, and Figures 2 and 3 are similar views with the cover partly and fully open, respectively.

In the construction illustrated, near the bottom of the back wall of the body there is a wide shallow recess 2 to the lower edge 3 of the mouth of which is hinged a panel or cover 4 for the mouth of the recess. Locks or catches 5, 5 are provided for holding the panel in its closed position, when it completely conceals the recess and its contents. It is shaped to conform, in the closed position, to the contour of the back of the body.

This cover is adapted to be opened to a substantially horizontal position (Figure 3) and so form a tray to receive luggage, and it is held in this position at each side by hinged links 6, 7 which are substantially in line when the tray is horizontal but can fold up, ruler fashion, as it is moved about its pivot to close up the mouth of the recess.

Preferably the two upper links 7, 7 are not directly pivoted to the sides of the recess but are instead pivoted to the lower ends of short pillars 8, 8 which are formed with cranked portions or lugs 9, 9 hinged in the recess, as shown. The two pillars 8, 8, which stand up somewhat in front of the body back (when the cover is open), are connected together above their pivotal supports by cross rails 10, 10. The parts are so arranged that, when the cover or tray 4 is in its horizontal, luggage-carrying, position, as shown in Figure 3, the rails and pillars, forming together a guard, lie just clear of the upper edge of the body around the recess and serve to protect or screen it from damage by the luggage. When the tray 4 is moved to close the mouth of the recess, the guard simultaneously drops into the recess to be concealed therein.

The recess may project well into the back of the body and its floor be flush with the tray (when open) and adapted to receive part of the luggage, so that very considerable carrying capacity is provided. Strap eyes 11, 11 may be attached to the outer edge of the tray and also to the mouth or back walls of the recess. The holding straps (such as 12) would preferably be fitted so as to pass between the luggage (when in position) and the rails 10 of the guard so that neither part of the carrier would be able to move.

What I claim as my invention and desire to secure by Letters Patent of the United States is:—

1. For a motor-vehicle, a luggage-carrier comprising the combination with the vehicle body having a recess formed in it, of a cover, for the mouth of the recess, which is movable into an open, luggage-supporting position, a guard for screening an edge of the vehicle body around the recess, and pivoted links interconnecting the cover and guard and acting to support the former in the open and the latter in the screening position and to ensure that the guard will be withdrawn into the recess while the cover is being closed.

2. A luggage carrier for motor vehicles, comprising a vehicle body having a recess therein, a closure hinged on the body at the bottom of the recess adapted to be swung upwardly for closing the recess and adapted to be swung downwardly to project from the body and support luggage, foldable braces between the closure and the body adapted to fold into the recess when the closure is raised, and a body guard disposed in the recess and connected to said braces for movement thereby out of and above the recess when the closure is lowered to protect the body from contact with luggage on the closure.

3. A luggage carrier for motor vehicles, comprising a vehicle body having a recess therein, a closure for said recess hingedly connected to said body at the bottom of the recess and adapted to be swung upwardly to close the recess and to be swung downwardly and outwardly to support luggage, a pair of braces connected to the opposite ends of the closure, a body guard hingedly mounted in the recess at one end and adapted to extend outwardly and upwardly in spaced relation to the body above the recess, said guard having pivotal connection with said braces for swinging said guard into the recess when the closure is raised to close the recess.

JOHN DAVENPORT SIDDELEY.